United States Patent [19]
Fischer

[11] Patent Number: 5,374,019
[45] Date of Patent: Dec. 20, 1994

[54] MULTI-POSITIONABLE, COLLAPSIBLE TOOL BENCH

[76] Inventor: Terry D. Fischer, R.R. 2, Box 208, Harvey, N. Dak. 58341

[21] Appl. No.: 956,250

[22] Filed: Oct. 5, 1992

[51] Int. Cl.$^5$ ............................................. A47G 29/00
[52] U.S. Cl. ................................... 248/122; 248/124; 248/128; 248/284
[58] Field of Search ............... 248/122, 124, 125, 128, 248/129, 130, 131, 150, 415, 418, 176, 183, 185, 186, 278, 281.1, 282, 284; 108/138, 140, 144, 145

[56] References Cited

U.S. PATENT DOCUMENTS

| | | | |
|---|---|---|---|
| 1,936,529 | 11/1933 | Taylor | 248/124 |
| 1,947,801 | 2/1934 | Russell | 108/144 X |
| 2,167,803 | 8/1939 | Graham et al. | 248/124 X |
| 3,339,938 | 9/1967 | Edmisson | 248/124 X |
| 3,385,036 | 5/1968 | Webb | 248/124 X |
| 3,517,625 | 6/1970 | Swett | 108/144 |
| 4,119,044 | 10/1978 | Hines | 248/125 X |
| 4,482,196 | 11/1984 | Wolens | 108/140 X |
| 4,714,222 | 12/1987 | Kiesel et al. | 248/282 |
| 4,728,065 | 3/1988 | Coote | 248/129 |
| 4,783,036 | 11/1988 | Vossoughi | 248/122 X |
| 5,038,819 | 8/1991 | Sutphen | 248/129 X |
| 5,126,928 | 6/1992 | Hughes | 248/122 X |
| 5,165,632 | 11/1992 | Kuan | 248/129 |
| 5,181,681 | 1/1993 | Edwards | 248/125 |
| 5,236,160 | 8/1993 | Sechelski | 248/125 |

Primary Examiner—Alvin C. Chin-Shue
Assistant Examiner—Derek J. Berger
Attorney, Agent, or Firm—David A. Lingbeck

[57] ABSTRACT

This invention relates to a multi-positionable, collapsible tool bench comprising a moveable base assembly, a vertical upstanding tubular support member having a bottom section securely mounted on said base assembly and a T-shaped top section swivelably mounted upon said bottom section, a boom assembly having a plurality of section members hingedly connected end to end for adjustable positioning of a tray which is securely mounted to the outermost section of the boom assembly, and an adjustable locking means mounted at each hinged joint to lockingly secure the respective section members about the respective hinged joints. The boom assembly is adjustable to any height and extension within the dimension limitations of the tool tray. At least one continuous passage extends entirely through this tubular structure from the bottom of the support member to the outermost section member of the boom assembly. An air line and an electric cord is ideally strung through the passage to conceal them so users of the tool tray or even passerbys won't accidentally trip over the air line or electric cord, which would otherwise be possible, if they were instead hanging freely to the outside of the tool tray. This tool tray can be ideally used for many different applications including working above or below most any vehicle or working in or about a building.

3 Claims, 8 Drawing Sheets

MULTI-POSITIONABLE, COLLAPSIBLE TOOL BENCH

BACKGROUND OF THE INVENTION

This invention relates to a multi-positionable, collapsible tool bench for operationally storing tools, parts, and the like for a user working on machinery, vehicles, and the like.

Tool benches and trays are indeed old in the art. Inventors have designed various types and styles of tool benches and trays to perform various tasks. New and improved tool benches and trays are always in demand by users of them. Known prior arts have not eliminated the need for better tool benches and trays. One known prior art is a PORTABLE WORKBENCH, U.S. Pat. No. 4,364,548. This invention has a combination tabletop/dual-screw vise in which the ends of the vise screws are constrained against both lateral and vertical movement. This workbench includes pipe legs which are readily removeable from leg sockets without fasteners. This workbench cannot be raised or lowered, extended or retracted unlike the present invention.

Another known prior art is a PORTABLE LIGHT TABLE, U.S. Pat. No. 5,083,241. This invention comprises an illuminated work area, an electrical extension cord retractor, an electrical outlet strip, and a protective wire screen. The table is moveable, but the table surface is not adjustable, horizontally or vertically.

Another known prior art is a POSITIONABLE SERVICE BENCH, U.S. Pat. No. 5,116,264. This service bench comprises a U-configuration base, a vertical mast structure, a winch mounted on the mast structure, a cable mounted to an elevator assembly to raise or lower the tool tray, and a light fixture located at an end of the tool tray. This tool tray can be selectively raised and lowered as the need arises, but it cannot be extended to reach tight quarters or conveniently retracted for easy storage of the service bench. This invention is intended to be used for heavy duty types of jobs.

Another known prior art is a FOLDABLE WORKBENCH, U.S. Pat. No. 4,278,243. This invention comprises a work table, leg assemblies, linkages to pivotally interconnect pairs of legs to fold the workbench, and clamping vise integral to the work table for securing a work article on the table. This workbench can be conveniently folded when not being used. However, this workbench cannot be raised or lowered, extended or retracted to accommodate a user working on top of equipment or the like.

Another known prior art is an ADJUSTABLE TOOL TRAY, U.S. Pat. No. 4,488,497. This tool tray comprises a vertical upstanding support member with a series of spaced diametrical holes through the support member for selective vertical adjustment of a tray hingedly mounted to the vertical upstanding support member. This tool tray also includes an electrical cord strung to the outside of the vertical upstanding support member and connected to a pair of electrical outlets mounted to an end of the tray for energizing electrically-powered tools for use therewith. The tray is foldable down unto the vertical upstanding support member for convenient out-of-the-way storage of the tool tray. This tool tray is positionable over a work area, but the vertical upstanding support member is fixed in a vertical upright position and cannot be horizontally extended unlike the present invention. The horizontal extension of the tool tray is restricted to the length of the tray.

Another known prior art is a FOLDABLE MACHINIST'S TOOL TRAY, U.S. Pat. No. 4,728,065. This invention comprises a tray fixed in a horizontal position, mounted on a telescoping vertical shaft attached to a base assembly. The shaft is adjustable upwardly and downwardly and is foldable unto the base assembly with the tray remaining in a horizontal position, resting on the base assembly. Unlike the present invention, the foldable machinist's tool tray is not extendible horizontally and vertically and has a horizontal reach which is restricted to the length of the tray.

There are occasions when the noted above prior art can not be effectively used because either the base unit cannot get close enough to the equipment to be of use to the user or the horizontal reach of the tray is not long enough for the user. There is a definite need for a new multi-positionable, collapsible tool bench which overcomes the problems noted above.

SUMMARY OF THE INVENTION

The present invention relates to a multi-positionable, collapsible tool bench which comprises a wheeled tubular base assembly, a vertically upstanding tubular support member, an adjustable tubular boom assembly having a plurality of boom section members hingedly connected, a plurality of adjustable locking means comprising a plurality of ratchet and pawl members attached to the hinge joints of the section members to selectively adjust the position of each section member, and a tray fixedly attached to the outermost boom section member and having a portion of the tray magnetized near an edge thereof to adhere metallic parts and the like to the tray. This collapsible tool bench is arranged so as to form a continuous passage through the tubular structure extending from the bottom of the base assembly to the outermost boom section member. This tool bench also has an electric outlet strip attached to an edge of the tray with the electric cord connected to the strip strung through the continuous passage to protect the cord and to conceal the cord so the user or a passerby don't trip over an exposed cord. Further, the vertically upstanding support member has a top T-shaped section which restrictively swivels about a bottom cylindrical section to allow the user to swing the boom away to either side without having to readjust the base assembly.

It is an object of this invention to produce a multi-positionable, collapsible tool bench which can be easily adjusted to any desired position, horizontal or vertical or combinations thereof, for use in many applications, common or unusual. The boom can be fully extended vertically to heights not reachable by the prior art having only the vertical upstanding support member capable of being extended, with the outermost boom section remaining generally horizontal.

Another object of this invention is to produce a multi-positionable, collapsible tool bench which is durable, light-weight, and not overly cumbersome like other tool trays for easy operational use.

Further, another object of this invention is to produce a multi-positionable, collapsible tool bench which the boom member can be easily horizontally swung to either side without having to move the base assembly to adjust the positioning of the tool bench with the user having to alight from atop the equipment to readjust the positioning of the base assembly to use the tool bench.

Also, another object of this invention is to produce a multi-positionable, collapsible tool bench which is designed to conveniently reach upward and outward over hard-to-get-to structures such as engine compartments of trucks and will, as a result, minimize potential injury to the user since the tool bench will support those objects for which the user often has had to alight from the truck to get, which exposed the user to potential injury from having to repeatedly climb upon and alight from the truck.

Yet, another object of this invention is to produce a multi-positionable, collapsible tool bench which is capable of taking many shapes and forms for many types of applications, capable of being collapsed and folded to a compact and convenient storable bench, and yet, capable of supporting upto a hundred pounds on the tray.

Further objects and advantages of the present invention will become apparent as the description proceeds and when taken in conjunction with the accompanying drawing wherein:

DETAILED DESCRIPTION OF THE INVENTION

Figure 1:
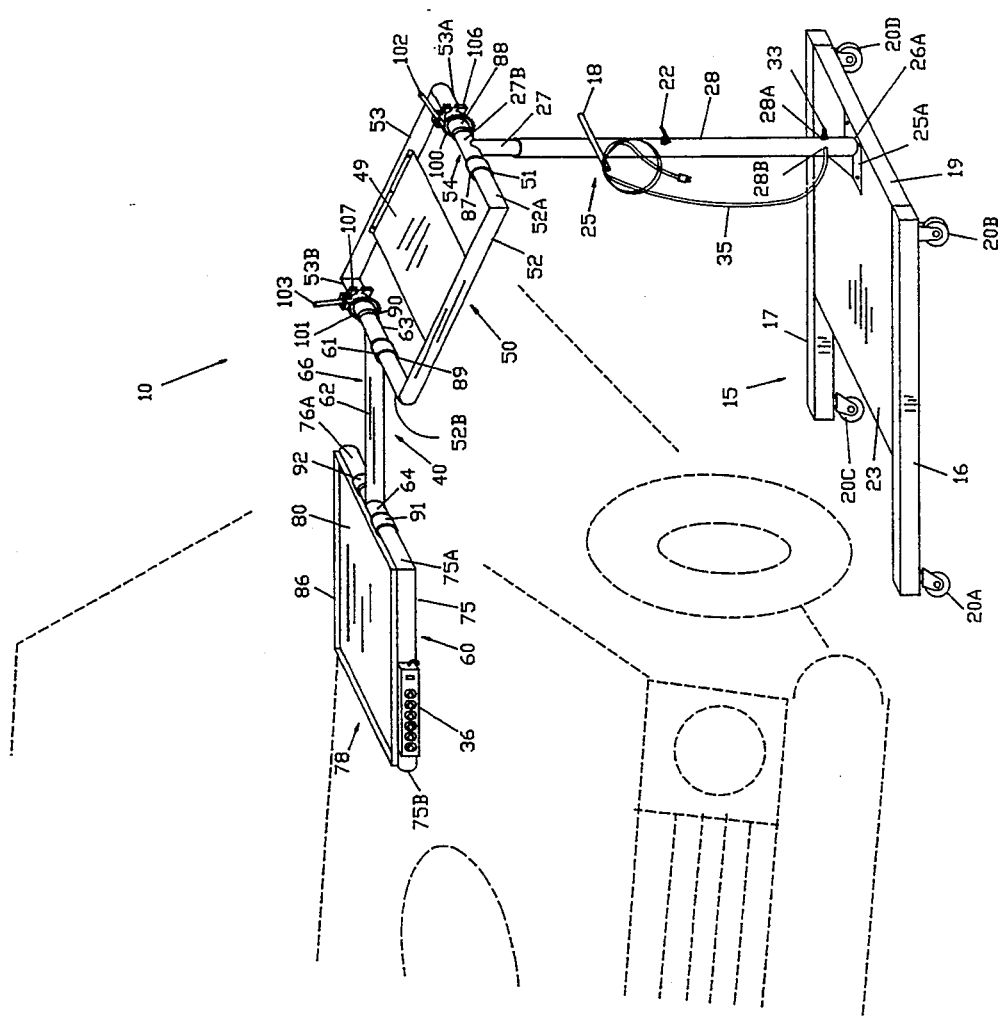
FIG. 1 is a perspective view of the tool bench with the section members of the boom assembly swung upwardly and outwardly over an engine compartment of a vehicle with the outermost section member remaining horizontal.

Referring more particularly to the drawings in FIGS. 1, 2, 3, 4, 5, 6, 7, and 8, the multi-positionable, collapsible tool bench 10 is illustrated as having a base assembly 15 having a pair of elongate longitudinal, generally horizontal members 16 and 17 laterally spaced from each other, a transverse member 19 connected or welded to an traversing between the laterally-spaced longitudinal members 16 and 17 near an end of each thereof, a platform 23 having opposite ends securely mounted or welded to the longitudinal members 16 and 17 and having an end securely mounted or welded to the transverse member 19, and caster-like wheels 20A, 20B, 20C, and 20D fixedly attached with set screws (not shown) to the bottom of the longitudinal members 16 and 17 near the ends thereof; having a vertically upstanding tubular support member 25 with a square mounting plate 25A having an aperture (not shown) therethrough and welded to a bottom end 26A of the support member 25, the mounting plate 25A being bolted to the platform 23 and the transverse member 19 with the support member 25 extending upwardly from the base assembly 15; a tubular boom assembly 40 comprising two section 50 and 60 hingedly connected for relative swingable movement about their respective hinged joints 51 and 61; a continuous passage 24 extending through the tubular configuration from near the bottom end 26A of the support member 25 to an outermost section member 60 of the boom assembly 40; an air line 30 extending through the passage 24 and connected to an air line adapter coupler 31 mounted into a wall 72 of the outermost section member 60 of the boom assembly 40; an electric cord 35 strung through the passage exiting a port 73 in the outermost section member 60 and connected to an electric outlet strip 36 mounted to the outermost section member 60; a tray 80 mounted with screws (not shown) to the outermost section member 60 with the tray 80 having a magnetic portion near an inside edge thereof to attract and hold parts or the like to the tray 80. As a modification, this tool bench 10 could include a drawer (not shown) slidably mounted on two laterally-spaced slideways (not shown) extending beneath the tray 80. This tool bench 10 is preferably constructed of all lightweight steel or aluminum or a combination of steel or aluminum with the boom assembly 40 essentially made from PVC tubing.

As shown in FIGS. 1, 2, 3, and 4 the caster-like wheels 20A-20D are fastened with set screws (not shown) to the bottom of the longitudinal members 16-17, one near each end thereof, for moving about the tool bench 10. Further, the platform 23 can be used to conveniently support a tool box or heavy power tools or the like.

As shown in FIG. 9, the base assembly 15 may modifiedly comprise a table 16A having a table top 16B and four downwardly extending, generally vertical adjustable telescoping legs 17A-D mounted on a quadrilateral shelf 18A with the caster-like wheels 20A-20D riveted to the bottom of the shelf 18A at the corners thereof, for supporting tools, parts, or the like. The telescoping legs 17A-D have a plurality of diametrical holes 19A extending through the walls 17E of the legs and spaced along the length of the legs 17A-D. Four pins 22A-D, one for each leg, are slidably insertable in the holes 19A of the legs for lockingly securing the legs 17A in a selective vertical position to adjust the height of the table top 16B. The vertical upstanding tubular support member 25 is removeably mounted with the mounting plate 25A to the table top 16B near an edge thereof.

As shown in FIGS. 1, 2, 3, and 4, the vertical upstanding tubular support member 25 comprises a tubular top section 27 and a hollow cylindrical bottom section 28. The top section 27 has a crosspiece coupler tube member 27 affixed or welded perpendicular to the top section 27 at a top end thereof. The crosspiece member 27 forms generally a T shape with the top section 27. A continuous passage 24 extends through the bottom of the bottom section 28 and through the crosspiece coupler tube member 27. The diameter of the top section 27 is approximate to the inside diameter of the bottom section 28 and is generally swivelably mounted through the top end 27A of the bottom section 28. A short coupler tube (not shown) having a diameter approximate to the inside diameter of the bottom section 28 and having a finger-like projection (not shown) integrally and axially extending therefrom is securely mounted or tack welded inside the bottom section 28 near the bottom end thereof to prevent the crosspiece member 27B from engaging the bottom section 28 and to restrict the swivel movement of the top section 27 relative to the base assembly 15 to approximately 180 degrees. As shown in FIG. 1, a swivel restrictor member 22 having a threaded cylindrical body and a T handle at one end for rotating the swivel restrictor member 22, is threaded in through the wall of the bottom section 28 to adjustably engage the top section 27 to appreciably restrict the top section 27 from swiveling within the bottom section 28 and about the vertical axis of the bottom section 28. The bottom end (not shown) of the top section 27, opposite the crosspiece member 27B terminates in the bottom section 28 and rests on the coupler tube (not shown). Further, the bottom section 28 has a pair of ports 28A and 28B extending therethrough near the bottom end 27A thereof. A steering rod member 18 is welded or fixedly attached perpendicular and at its central portion to the bottom section 27 near the top of the bottom section 27. The steering rod member 18 can be grasped by a user to maneuver the tool bench 10 for applicable use.

As illustrated in FIGS. 1, 2, 3, 4, and 5, the innermost section member 50 of the boom assembly 40 comprises a first pair of U-shaped tube members 52 and 53 arranged in a generally rectangular configuration to effectively resist twisting of the boom assembly 40 and resist torsional forces effected from swiveling the boom assembly 40 relative to the base assembly means. A brace member 49 traverses between the first two U-shaped tube members 52 and 53 and has opposite ends riveted to the first two U-shaped tube members to provide strength to the boom assembly 40 and to help resist torsional or twisting forces as the tool bench 10 is maneuvered. The innermost section member 50 has an inner end 54 hingedly connected to the support member 25. The first pair of U-shaped tube members 52 and 53 have inner end wing ends 52A-53A and outer end wing ends 52B-53B at their ends. The inner end wing ends 52A and 53A of the first two U-shaped tube members 52 and 53 comprise the inner end 54 of the innermost section 50 and are coupled together with the T crosspiece coupler tube 27B of the top section 27 of the support member 25. The T crosspiece coupler tube 27B has enlarged or flared ends 87-88 for rotatably and engageably receiving the ends of the inner end wing ends 52A and 53A, which are slidably and rotatably mounted in the T crosspiece coupler tube 27B. The innermost section member 50 further has an outer end 55 comprising the outer end wing ends 52B and 53B of the first U-shaped tube members 52 and 53.

Figure 2:
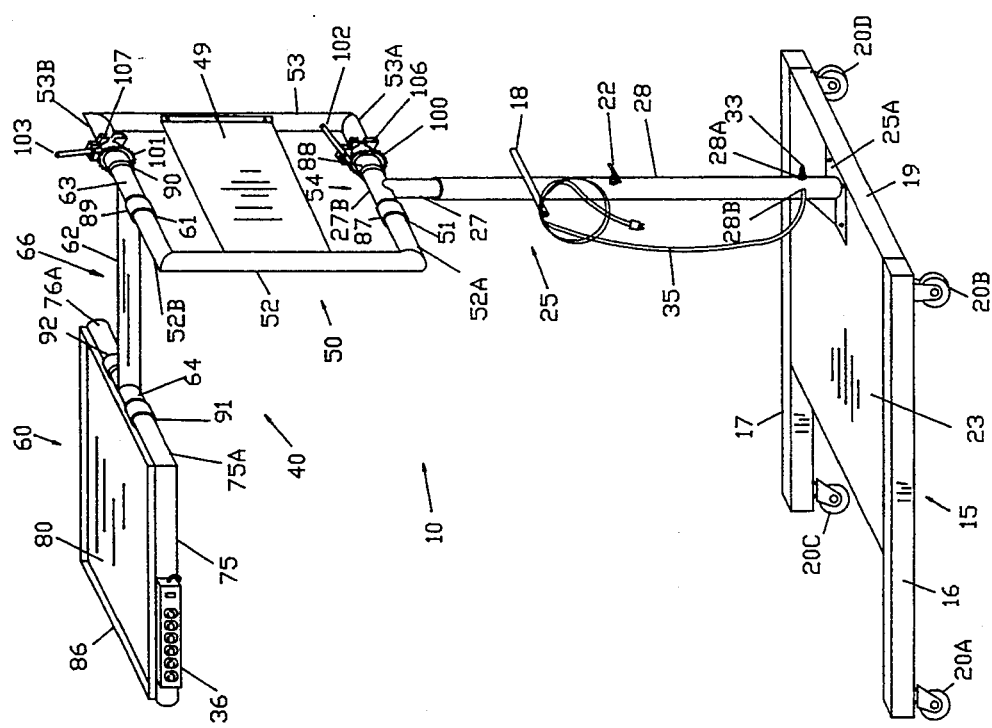
FIG. 2 is a perspective view of the tool bench with much of the boom assembly except for the outermost section member vertically extended in alignment with the support member showing how it can be used to work high up.

As shown in FIG. 2, the boom assembly 40 further has an outermost section member 60 having an elongate cylindrical tube member 62 with a first and second crosspiece coupling members 63 and 64 having longitudinal axes generally perpendicular to the longitudinal axis of the cylindrical tube member 62. The first and second crosspiece members 63 and 64 are fixedly attached or welded at opposite ends of the cylindrical tube member 62 to generally form a double T member 66. The outer end wing ends 52B and 53B at the outer end 55 of the innermost section member 50 are coupled together by the first crosspiece coupling member 63. The first crosspiece coupling member 63 has enlarged or flared ends 89-90 for engageably receiving the ends of the outer end wing ends 52B and 53B, for rotation therein. The second crosspiece coupling tube member 64 is welded to or fixedly attached to inner end wing ends 75A-76A of a second pair of U-shaped tube members 75-76 of the outermost section 60. The second crosspiece member 64 has enlarged or flared ends 91-92 to engagedly and securely receive the ends of the inner end wing ends 75A-76A. The second pair of U-shaped tube members 75-76 are arranged in a plane with the double T member 66 and have outer end wing ends 75B-76B interconnected with a short coupler tube 79 having enlarged or flared ends 93-94 to engageably and securely receive the outer end wing ends 75B-76B. The outer end wing ends 75B-76B form an outer end 78 of the outermost section 60. The tubular structure of the outermost section 60 is arranged in a generally planar square configuration for supporting a tray 80 which is detachably mounted with sheet metal screws (not shown) upon the second U-shaped tube members 75-76. The tray 80 has an upstanding ridge 86 about the perimeter thereof to substantially prevent parts and the like from falling off the tray 80. A portion of the tray 80 near the ridge 86 on one end of the tray 80 is magnetized to attract and hold parts on the tray 80 and to prevent parts and the like from moving about the tray surface and to guard against a user accidentally losing the parts or the like.

The boom assembly 40 may be modified to include additional sections hingedly attached at their opposite ends to the innermost section 50 and the outermost section 60.

Figure 8:
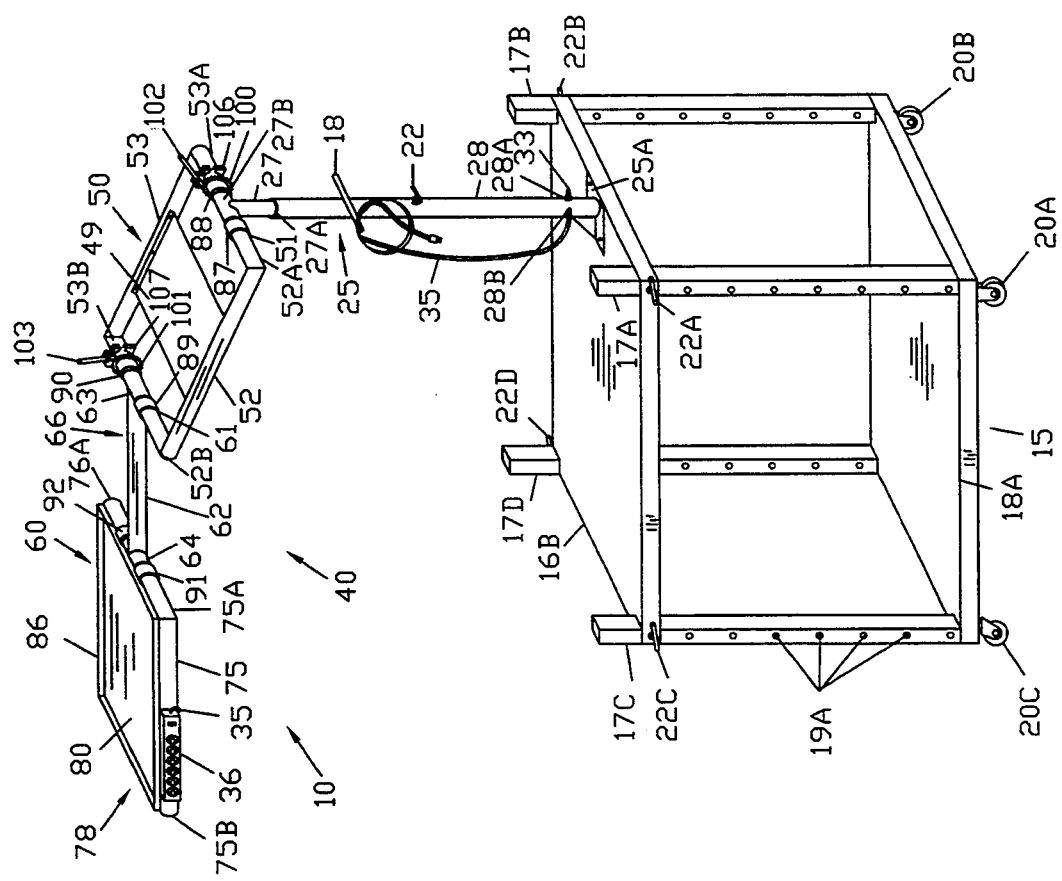
FIG. 8 is a perspective view of the support member and boom assembly mounted to a wheeled, adjustable table.

The support member 25 and the boom assembly 15 are connected to form at least one continuous passage 24 through the entire tubular structure. The passage 24 essentially extends from near the bottom end 26A of the support member 25 through the tubular structure to the outermost section member 60. As shown in FIG. 8, an air line 30 is inserted through the passage 24 and has one end threaded into one end of a first elbow member 37 mounted inside the coupler member 79 at the outer end 78 of the outermost section 60 and has its other end threaded into an end of a second elbow member 38 mounted inside the bottom section 27 of the support member 25 substantially in alignment with the port 28A. An air line adapter coupler 31 is mounted to and extends through the wall 72 of the coupler member 79 and is threaded to the other end of the first elbow member 37 and extends outwardly generally in the plane of the outermost section member 60, for detachable connection to an air line attachment or the like. An air line adapter plug member 33 is securely mounted in the port 28A in the support member 25 and is securely threaded to the other end of the second elbow member 38. An air compressor or supply (not shown) is connectable to the air line plug 33, allowing the user to have ready access to compressed air should the user need air for any means including clearing dirt from the engine compartment or providing compressed air to use impact tools. The air line 30 extending through the passage 24 is concealed and hidden from the user so that the user won't accidentally trip over the air line 30 during the use of the tool bench 10.

As shown in FIG. 8, an electric cord 35 extends in through one of the ports 28B in the support member 25 and extends through the passage 24 from near the bottom end 26A of the support member 25 to the outermost section member 60 and is attached to a junction box (not shown) which is connected to an electric outlet strip 36 securely mounted with sheet metal screws (not shown) to the wall of one second pair of U-shaped tube members 75 beneath an end of the tray 80. The electric cord 35 is effectively concealed and hidden so that the user won't trip over the electric cord 35. The electric outlet strip 36 permits the user to have electric power means readily available nearby should the user need to power electric devices to effectively do his/her work without having to string an extension cord to an electric outlet mounted to a wall or to string additional cords for each electric device used.

As shown in FIGS. 1, 2, 3, 4, and 5, two adjustable locking means comprising preferably two ratchet wheels 100-101 and spring-loaded pawls 102-103 are mounted to the hinged joints 51 and 61 of the tool bench 10, one at each joint. Effectively, at each hinged joint, the ratchet wheel is circumferentially and securely mounted or welded about the coupler tube member near an end thereof. The pawls 102-103 are pivotally mounted with pins 104-105 to block members 111 fixedly attached or welded to the tops of pipe clamps 106-107 each being fixedly attached with a pair of straight bolts 98 about the wing ends of the U-shaped tube member 53 of the innermost section 50, and are engagedly biased with springs 95 and 96 to the notches 109 between the teeth 108 of the ratchet wheels to selectively, lockingly secure the section members 50 and 60 of the boom assembly 40 at desired positions and to prevent downward or upward swinging of the section members 50 and 60 to undesirable positions. The springs 95 and 96 have one end clipped to the pawls 102-103 just above the pivot point of the pawls 102-103 and the other end attached to or clipped about one of the elongate bolts at each hinged joint to bias the pawls 102-103 to the notches 109 between the teeth 108. The pipe clamps 106-107 each comprise a pair of brackets 110 having arcuate ends cooperatively contoured to fit and clamp about the wing ends of the U-shaped tube member 53. The brackets 110 are fastened about the U-shaped tube member 53 with elongate bolts 98 and nuts (not shown). The spring-loaded pawls 102-103 are positioned with ends of the pawls 102-103 effectively biasing or engaging between the teeth 108 of the ratchet wheels 100-101 and with the opposite ends of the pawls 102-103 extending conveniently outwardly away from the ratchet wheels 100-101 for accessible use by a user to release or disengage the pawls 102-103 from the ratchet wheels 100-101 for positioning the section members 50 and 60 of the boom assembly 40 about the hinged joints 51 and 61. Further, the longitudinal axes of the pawls 102-103 are substantially in alignment with the circumferential edges of the respective ratchet wheels 100-101.

Further, other modifications of the adjustable locking means include using hydraulic ram assemblies each comprising a hydraulic cylinder and a shaft for controlled reciprocal movement therein to control the rotation of the section members about their respective hinged joints, or using worm gears each comprising a pair of cooperating gears to lockingly secure the section members 50 and 60, or using retractable sliding pin devices each comprising a sprocket wheel and a pair of retractable pins biased in between the sprockets of the wheel to lockingly secure the respective section members.

Each section member of the boom assembly 40 effectively rotates or swings about its respective inner end hinged joint. Each section member of the boom assembly 40 can be effectively rotated independently of the other section members. This tool bench 10 is adjustable to any desirable extension and height (i.e., horizontally and vertically) limited only by the dimensions of the boom assembly 40 and support member 25. As viewed on a three dimensional Cartesian coordinate system, the tray 80 is positionable at any point on the coordinate system. For example, as illustrated in FIG. 1, a user working in the engine compartment near the inside firewall of a vehicle can effectively position each section member of the boom assembly 40 so that the tray 80 extends to near the firewall of the vehicle for easy access by a user.

To adjust the boom assembly, the user rotates the individual section members of the boom assembly 40 to the desired positions using the ratchet wheel and pawl mechanism to lockingly secure the section members 50 and 60 once they are positioned. To adjust the positioning of the boom assembly 40 and the section members 50 and 60, the user applies force to the ends opposite the teeth-engaging ends of the pawls 102-103 to disengage the pawls 102-103 from between the teeth of the ratchet wheels 100-101, permitting the section members 50 and 60 to freely rotate about their respective hinged joints. To effectively adjust the boom assembly 40 to the desired position, the user should preferably adjust each section member of the boom assembly 40 individually with the innermost section member 50 being adjusted first and the outermost section member 60 last.

The user disengages the pawl 102 from the ratchet wheel 100 and rotates or swings the innermost section member 50 to a desired extension and height and then releases the pawl 102, allowing the pawl 102 to spring back into engagement with a notch 109 between the teeth 108 of the ratchet wheel 100, locking the innermost section member 50 at the desired position about the hinged joint 51. The user should preferably adjust the other section members in a likewise manner with the outermost section member 60 being preferably positioned with the tray 80 being generally horizontal for supporting tools and the like. As a modification to the ratchet and pawl mechanism, the ratchet wheels 100-101 and the pawls 102-103 may be protected with covers (not shown) which enclose the ratchet wheels 100-101 and the pawls 102-103 to guard against the user accidentally getting his/her fingers pinched between the ratchet wheels 100-101 and the pawls 102-103. The covers (not shown) may be hingedly attached with pins (not shown) to the clamp members 106-107.

Figure 3:
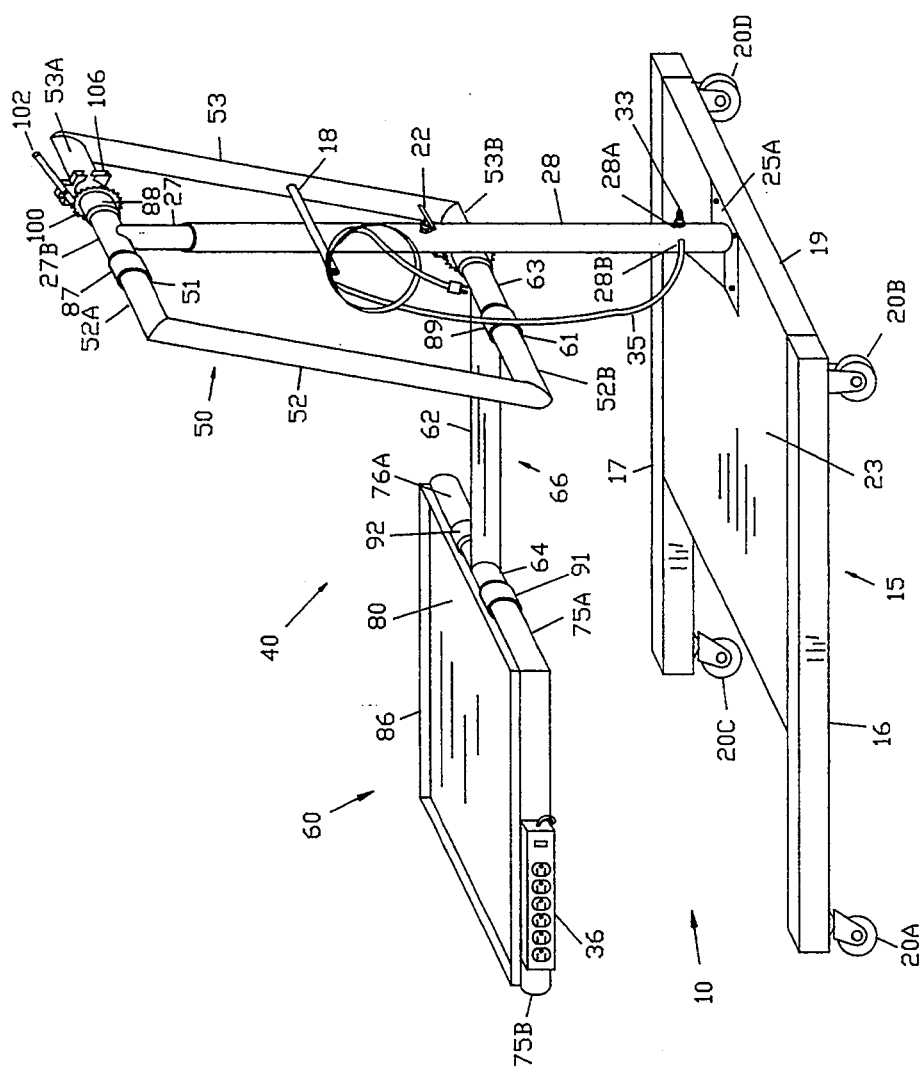
FIG. 3 is a perspective view of the tool bench with the section members of the boom assembly swung downwardly with the outermost section remaining horizontal showing how the tool bench can be used to work under a vehicle.

The tool bench 10 has many applications. For example, as shown in FIG. 2, the tool bench 10 can be effectively used to support buckets, tools, or the like while the user is standing on a ladder working on a structure such as a house or the like. The user can effectively extend the boom assembly 40 vertically with the outermost section member 60 being positioned generally horizontal to support the buckets, tools or the like. Further, as shown in FIG. 3, if the user wants to use the tool bench 10 while lying on his/her back working beneath a vehicle, the user can effectively adjust the boom assembly 40 to position the section members 50 and 60 downwardly near the surface of the ground with the outermost section member 60 remaining generally horizontal to support tools and parts or the like.

Figure 4:
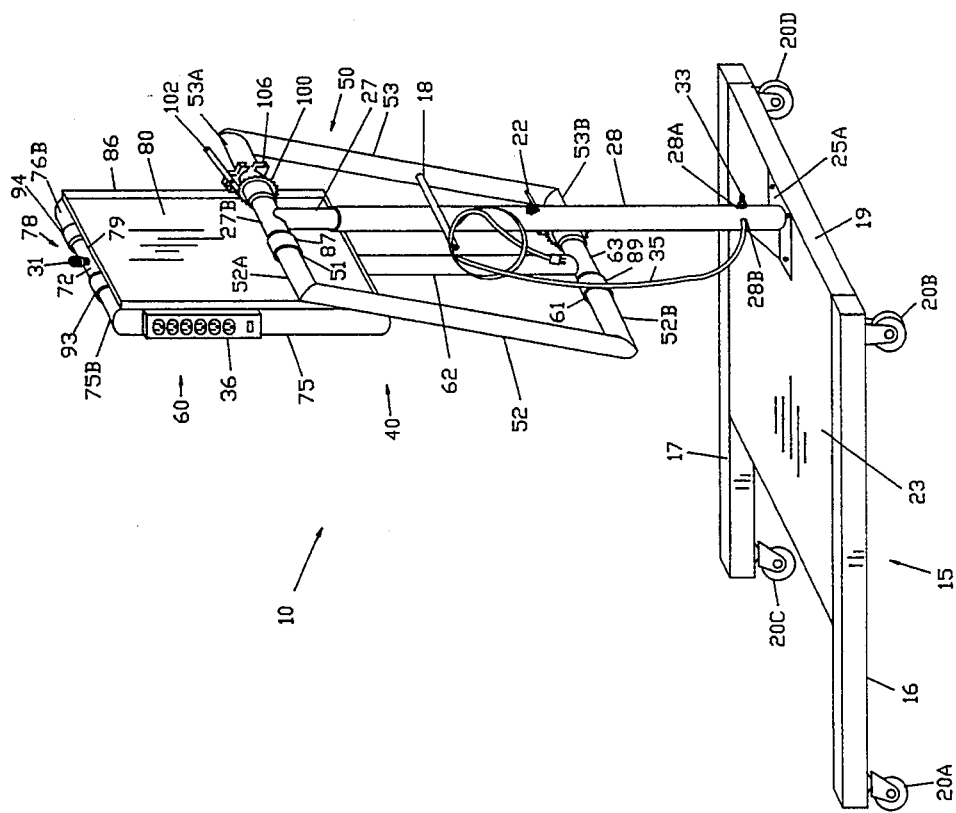
FIG. 4 is a perspective view of the tool bench with the section members of the boom assembly folded unto the support member for compactly storing the tool bench.
Figure 5:
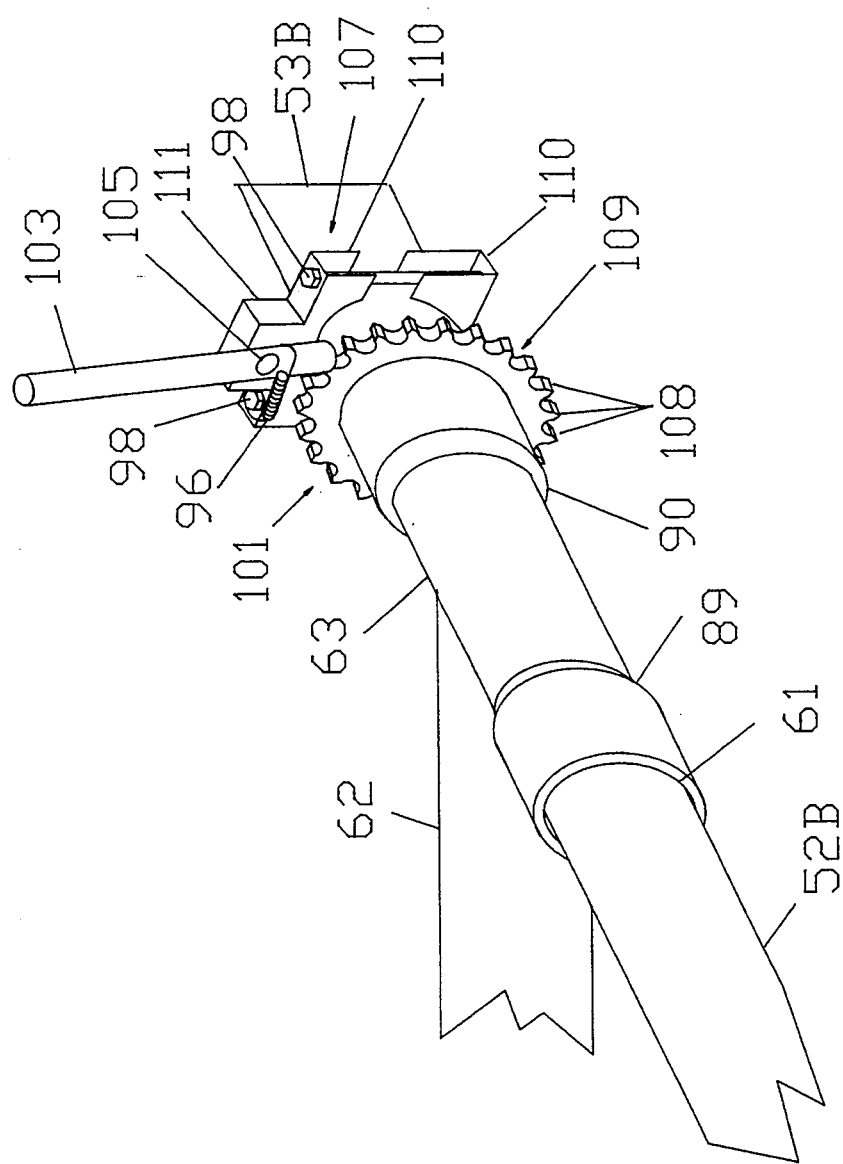
FIG. 5 is a section perspective view of the adjustable locking means securely mounted to a hinged joint of the tool bench.
Figure 6:
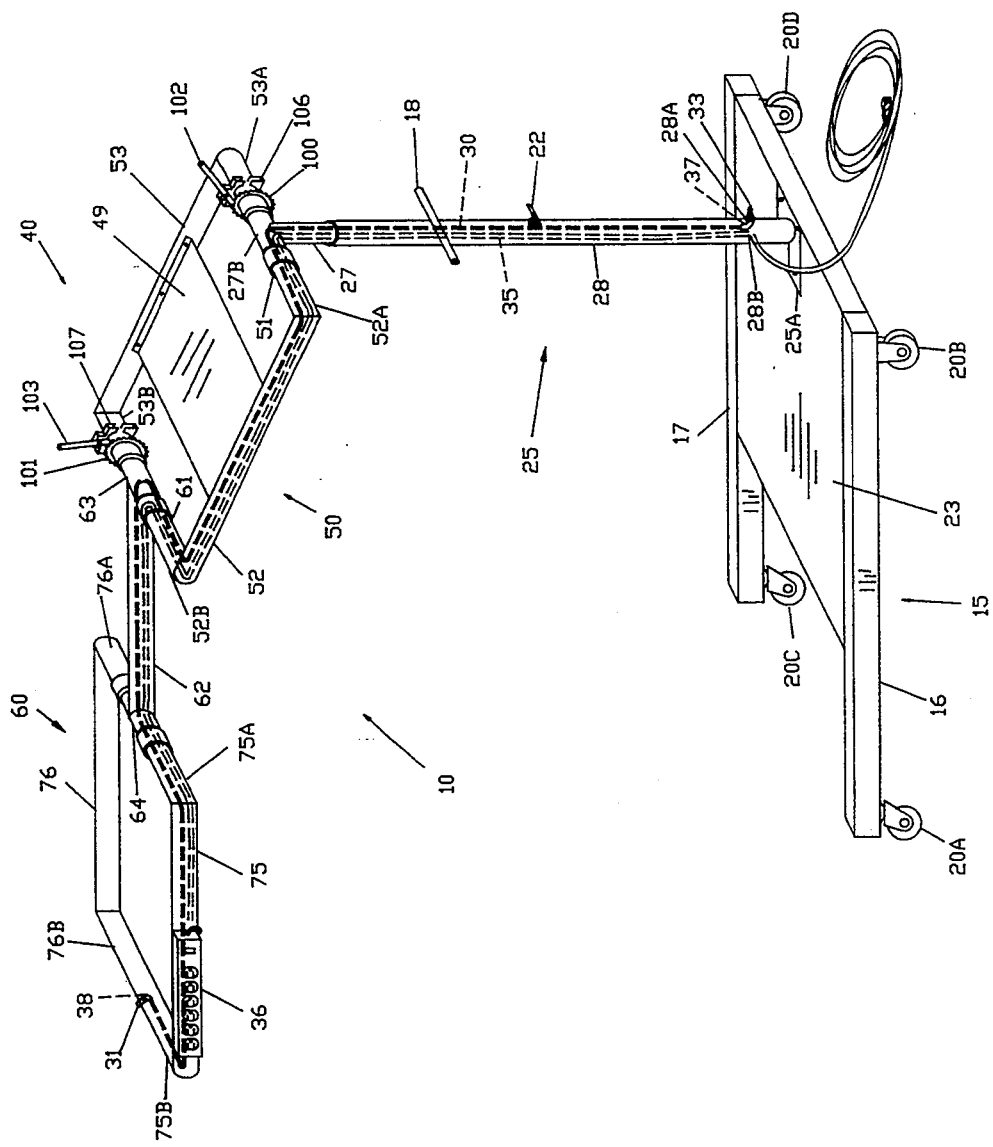
FIG. 6 is a perspective view of the tool bench without the tray showing the air line means and the electric cord strung through the passage of the tool bench and connected to an air line adapter disposed on the outermost section member and to a electric outlet strip mounted on the outermost section member respectively.
Figure 7:
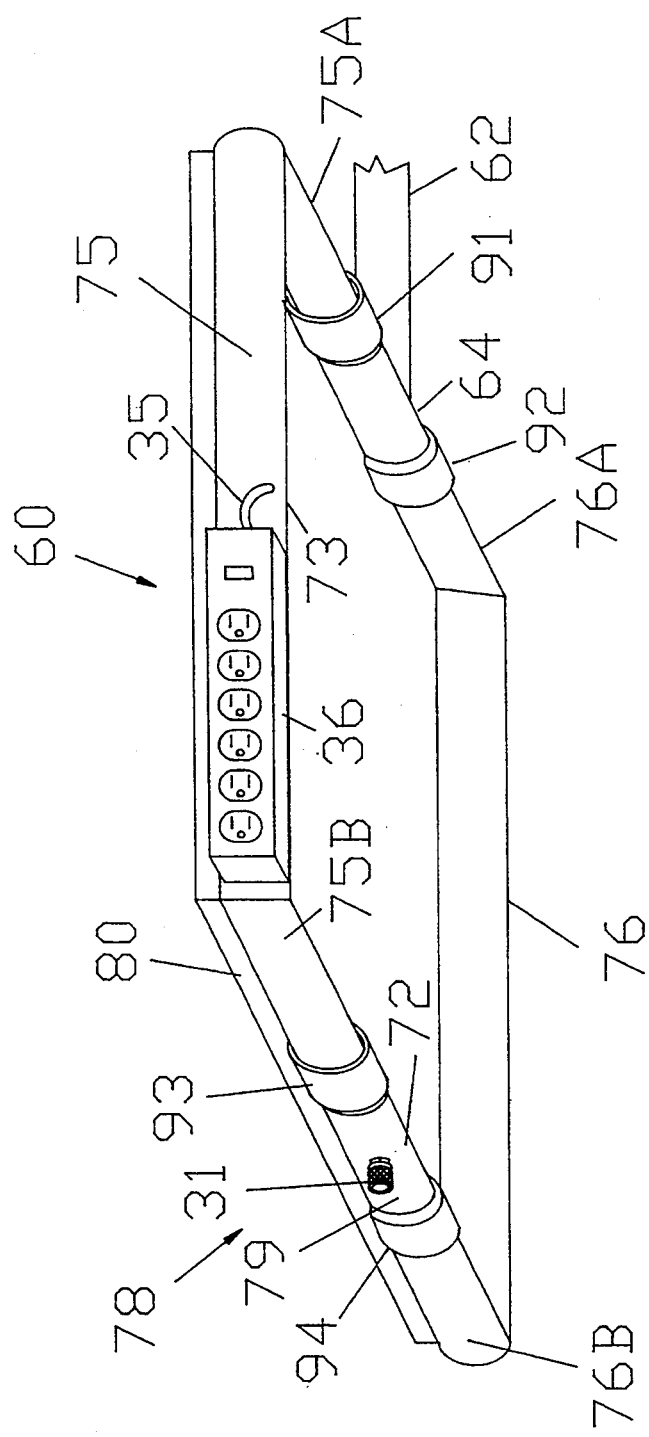
FIG. 7 is a section perspective view of the tool tray and of the outermost section member showing the air line adapter and the electric outlet strip mounted thereto as viewed from below the tool tray.

As illustrated in FIG. 4, the tool bench 10 is foldable and collapsible for effective and easy storage. The section members 50 and 60 of the boom assembly 40 are collapsible or foldable unto an inner section member or unto the support member 15. The outermost section member 60 and the innermost section member 50 are easily foldable vertically for effectively compacting the tool bench 10 for easy storage in small spaces.

It will be obvious that the various changes and departures may be made to the invention without departing from the spirit and scope thereof. Accordingly, it is not intended that the invention be limited to that specifically described in the specification or as illustrated in the drawing but only as set forth in the claims.

What is claimed is:

1. A multi-positionable, collapsible tool bench comprising:
    a base assembly means for stabilizing said tool bench;
    a tubular support member fixedly attached to and extending upwardly from said base assembly, said tubular support member having a T-shaped top section rotatably mounted upon a bottom section for horizontal swiveling said top section relative to said base assembly, said support member further having a top end;
    a boom assembly means hingedly attached to said top end of said support member and comprising at least two tubular section members hingedly connected end to end to form hinged joints, said section members selectively positionable about said respective hinged joints;
    a tray fixedly mounted on a section member of said boom assembly for supporting tools, parts, and the like, and having a magnetic portion thereon to attract and hold parts and the like on said tray; and
    at least two adjustable locking means securely mounted at said hinged joints to conveniently, lockingly secure said respective section members of said boom assembly at selectable horizontal or vertical positions or combinations thereof about said respective hinged joints.

2. A multi-positionable, collapsible tool bench as described in claim 1, wherein each said adjustable locking means comprises
    a ratchet wheel and pawl means securely mounted at said hinged joints to control and adjustably, lockingly secure said respective section members at selectable horizontal or vertical positions or combinations thereof about said respective hinged joints.

3. A multi-positionable, collapsible tool bench comprising:
    a base assembly means for moving and stabilizing said tool bench, said base assembly further comprising a wheeled table having a table top and having a plurality of adjustable legs for selective vertical adjustment of said table top, said legs having a plurality of diametrical holes through the walls thereof, said holes spaced along the length of said legs with a plurality of pins slidably insertable in said holes to lockingly secure said legs at selectable vertical positions of said table tops;
    a tubular support member fixedly attached to and extending upwardly from said base assembly having a bottom end and a top end;
    a boom assembly means having an end hingedly attached to said top end of said support member and comprising at least two tubular section members hingedly connected end to end, said section members selectively positionable about said respective hinged joints to applicatively accommodate a user;
    a tray fixedly mounted on a section member and near an end of said boom assembly and having an upstanding ridge about the perimeter thereof for supporting tools, parts, and the like; and
    at least two adjustable locking means securely mounted at said hinged joints to conveniently, lockingly secure said respective section members of said boom assembly at selectable horizontal or vertical positions or combinations thereof about said respective hinged joints.

* * * * *